US012102911B2

(12) United States Patent
Soryal et al.

(10) Patent No.: US 12,102,911 B2
(45) Date of Patent: Oct. 1, 2024

(54) E-GAMING ENHANCED USER EXPERIENCE

(71) Applicant: AT&T Intellectual Property I, L.P., Atlanta, GA (US)

(72) Inventors: Joseph Soryal, Glendale, NY (US); Nishit J. Sanghavi, Kenmore, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 190 days.

(21) Appl. No.: 17/721,422

(22) Filed: Apr. 15, 2022

(65) Prior Publication Data

US 2023/0330521 A1   Oct. 19, 2023

(51) Int. Cl.
*A63F 13/00* (2014.01)
*A63F 13/35* (2014.01)

(52) U.S. Cl.
CPC .................... *A63F 13/35* (2014.09)

(58) Field of Classification Search
CPC ........ A63F 13/30; A63F 13/35; A63F 13/355; A63F 13/335; A63F 13/79; A63F 13/77; A63F 13/358; A63F 13/45
See application file for complete search history.

(56) References Cited

FOREIGN PATENT DOCUMENTS

| CA | 2806557 A1 * | 2/2012 | ......... G06F 16/9574 |
| CA | 2797631 A1 * | 11/2012 | ......... G06F 16/9574 |

OTHER PUBLICATIONS

"Quality of service—Wikipedia", https://en.wikipedia.org/wiki/Quality_of_service, Accessed online Apr. 2, 2022, Apr. 2, 2022, 12 pages.
Bradley, Tony, "Facebook AI Creates Its Own Language in Creepy Preview of our Potential Future", https://www.forbes.com/sites/tonybradley/2017/07/31/facebook-ai-creates-its-own-language-in-creepy-preview-of-our-potential-future/?sh=2520205d292c, Jul. 31, 2017, 3 pages.
Lafrance, Adrienne, "What an AI's Non-Human Language Actually Looks Like," https://www.theatlantic.com/technology/archive/2017/06/what-an-ais-non-human-language-actually-looks-like/530934/, Jun. 20, 2017, 6 pages.

* cited by examiner

*Primary Examiner* — David L Lewis
*Assistant Examiner* — Eric M Thomas
(74) *Attorney, Agent, or Firm* — Guntin & Gust, PLC; Miyoung Shin

(57) ABSTRACT

Aspects of the subject disclosure may include, for example, a user input module to receive collected user inputs during game play by a user at user equipment, in an interactive game with a remote user provided by a gaming application, the user equipment in data communication over a network with remote user equipment of the remote user. Aspects of the subject disclosure may further include a network monitor module to monitor a network connection over the network with the remote user equipment and to identify a network game play interruption during the game play, and a game application programming interface (API) to automatically control game play during the network game play interruption to simulate game inputs of the user based on the collected user inputs so the remote user is unaware of the network game play interruption, wherein the game API is responsive to identification of the network game play interruption for automatically controlling the game play. Other embodiments are disclosed.

20 Claims, 10 Drawing Sheets

200

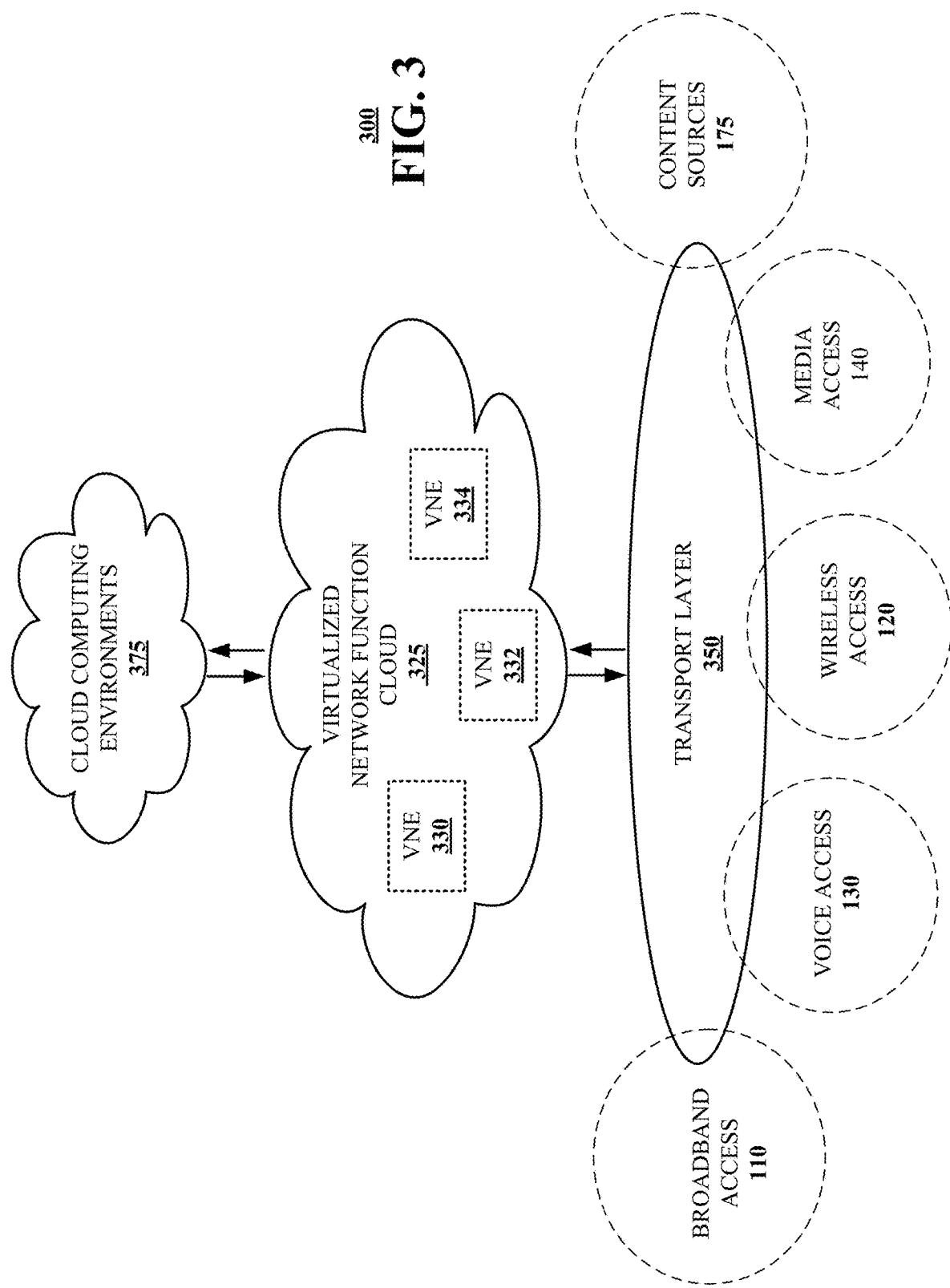

E-GAMING ENHANCED USER EXPERIENCE

FIELD OF THE DISCLOSURE

The subject disclosure relates to enhancing user experience for those participating over a data network in electronic gaming or electronic sports.

BACKGROUND

Online gaming is becoming increasingly popular. Players participate using user devices which communicate over data networks with near-real-time interaction. Any communication delay on the network can diminish user experience and satisfaction. Current networks cannot fully support the data transmission rates required for smooth gaming and at least a brief interruption may take place.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
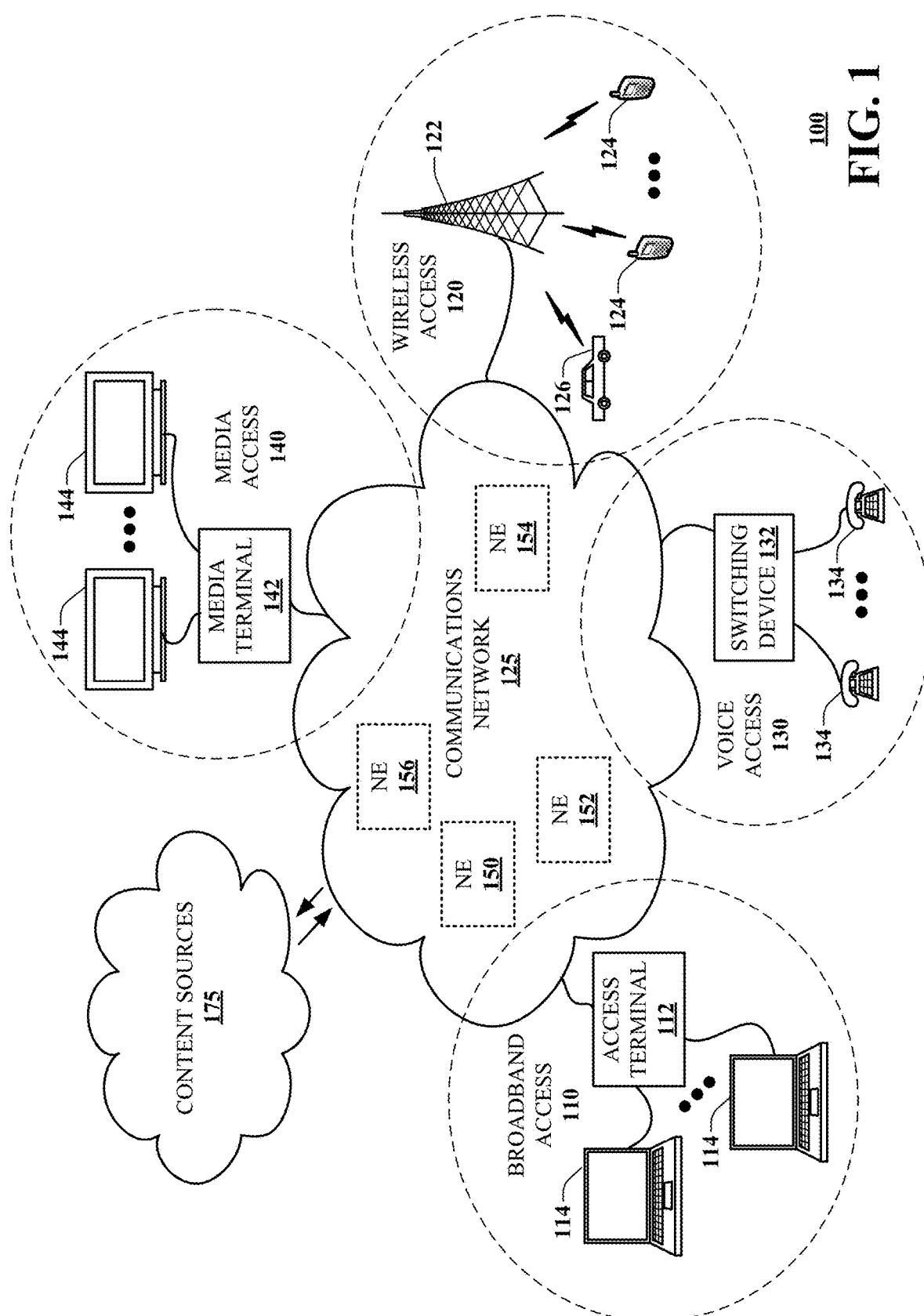
FIG. 1 is a block diagram illustrating an exemplary, non-limiting embodiment of a communications network in accordance with various aspects described herein.

The subject disclosure describes, among other things, illustrative embodiments for enabling an autonomous game-playing function to become active in response to brief network delays from the network of one game player and thereby render transparent and unobtrusive such network delays to other, remotely located users. Other embodiments are described in the subject disclosure.

One or more aspects of the subject disclosure include a user input module to receive collected user inputs during game play by a user at user equipment, in an interactive game with a remote user provided by a gaming application, the user equipment in data communication over a network with remote user equipment of the remote user. Aspects of the subject disclosure may further include a network monitor module to monitor a network connection over the network with the remote user equipment and to identify a network game play interruption during the game play, and a game application programming interface (API) to automatically control game play during the network game play interruption to simulate game inputs of the user based on the collected user inputs so the remote user is unaware of the network game play interruption, wherein the game API is responsive to identification of the network game play interruption for automatically controlling the game play.

One or more aspects of the subject disclosure include detecting user gaming inputs during game play by a user at user equipment, in an interactive gaming application with a remote user, the user equipment in data communication over a network with remote user equipment of the remote user, and learning, from the user gaming inputs, information about capabilities of the user in the interactive gaming application, forming learned user game play information, monitoring data communication over a network connection over the network with the remote user equipment. Aspects of the subject disclosure further include identifying a network game play interruption during the game play, the network game play interruption causing an apparent absence of the user during a network game play interruption duration and automatically controlling game play during the network game play interruption duration to simulate game inputs of the user based on the learned user game play information, the automatically controlling game play including mimicking the user gaming inputs to make the apparent absence of the user during the network game play interruption duration transparent to the remote user.

One or more aspects of the subject disclosure include learning information about capabilities of a user during game play in an interactive gaming application, forming learned user game play information, the user interacting with user equipment in the interactive gaming application with remote user equipment of a remote user over a network, and monitoring data communication over a network connection between the processing system and the network with the remote user equipment. Aspects of the subject disclosure further include identifying a network game play interruption during the game play, the network game play interruption causing an apparent absence of the user to the remote user during a network game play interruption duration, and automatically controlling game play during the network game play interruption duration to simulate game inputs of the user based on the learned user game play information, the automatically controlling game play including selecting simulated game inputs to mimic the game inputs of the user to make the apparent absence of the user transparent to the remote user.

Referring now to FIG. 1, a block diagram is shown illustrating an example, non-limiting embodiment of a system 100 in accordance with various aspects described herein. For example, system 100 can facilitate in whole or in part learning about how a user plays a game in an interactive gaming application with another player, detecting an interruption in network communication such as excessive delay, and automatically controlling game play during the interruption to simulate game inputs of the user based on how the user plays the game to make apparent absence of the user from the game transparent to the other player. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or another communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
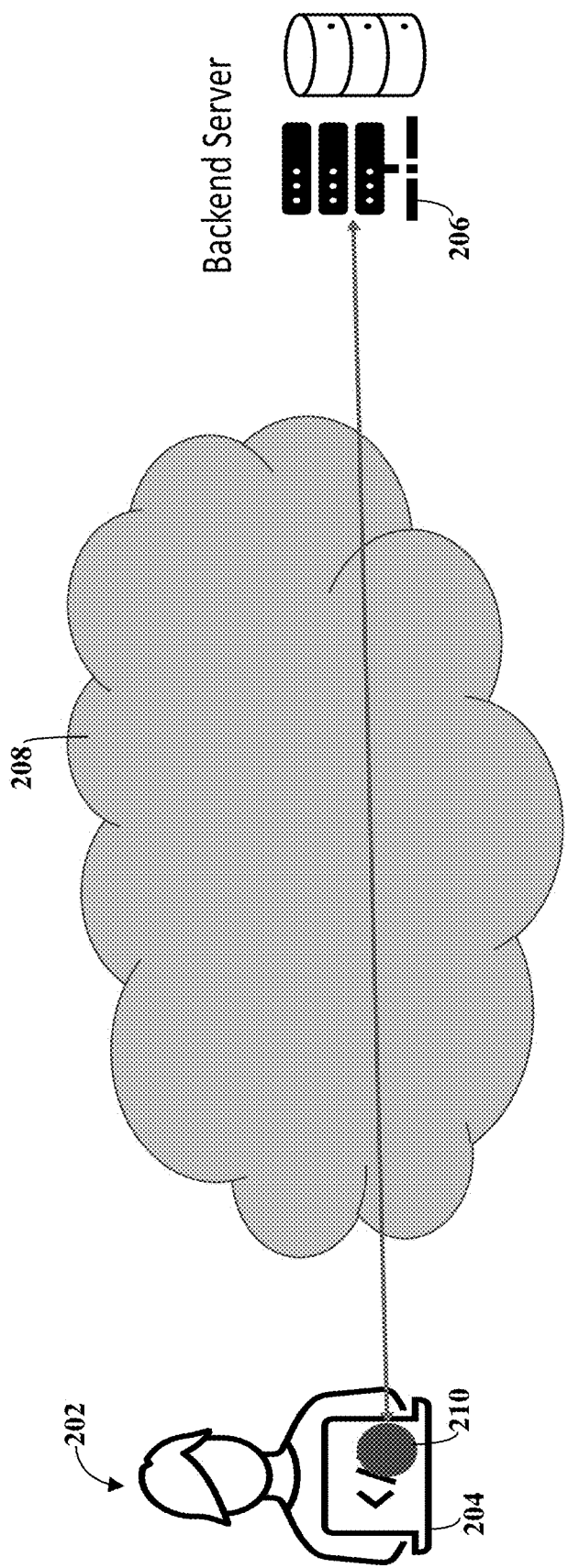
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200 functioning within the communication network of FIG. 1 in accordance with various aspects described herein. In the exemplary embodiment of FIG. 2A, a user 202 is engaging with a user device or user equipment 204 to participate in an online game. The user device is in data communication with a backend server 206 and other equipment over a network 208.

The user device or user equipment 204 is generally illustrated as a laptop computer. However, in embodiments, the user device or user equipment 204 may be any suitable computing device which includes a processing system including a processor and a memory that stores executable instructions. The executable instructions, when executed by the processing system, facilitate performance of operations by the user device or user equipment 204. The operations may include receiving inputs and commands from the user 202, communicating data over the network 208, and implementing a game.

The game may include video and audio aspects and in general is interactive in nature. For example, the user 202 playing the game engages or interacts with other players using similar user equipment. The video and audio aspects of the game may be very high resolution and involve transfer and processing of very large amounts of data. The game, in cooperation with the user equipment 204, may create a hologram of the user and the hologram may interact with holograms generated for other users or generated by the backend server 206. In embodiments, the user equipment may include, in addition to or instead of a laptop computer, devices such as a virtual reality or augmented reality headset, a camera located in the environment with the user, such as in the same room, a bodysuit with sensors to track motion of the user's body and actuators to create a touch sensation on the user's body. Further, the user equipment 204 may include one or more additional, supplemental video displays or audio equipment including microphones and speakers. Further, the user equipment 204 may include one or more sensors in the environment with the user 202 to sense any suitable characteristic, such as room temperature, which may be pertinent to the game play on the user equipment 204. The user equipment 204 includes a network interface to enable data communication, according to any suitable protocol, over networks including the network 208.

The backend server 206 may be any suitable computing equipment including a processing system. The processing system may include one or more processors and memory storing data and instructions to facilitate performance of operations by the processing system. The operations may include instantiating a video game or other interactive application for access by users such as the user 202. In some embodiments, multiple users such as user 202 can interact with each other, with the backend server 206 intermediating by sharing data and maintaining a common game state. In other embodiments, users such as the user 202 interact with the backend server 206 for the game play. The backend server 206 provides necessary data, information and instructions over the network 208 to users such as the user 202 and user device or user equipment 204.

The network 208 may be any data communication network, including wireline and wireless networks, and may include the public internet or proprietary networks. For example, some game developers may provide access to proprietary gaming software over proprietary networks. Users such as the user 202 using user device or user equipment 204 may have credentials that enable access to the proprietary gaming software at the backend server 206.

In embodiments, the user equipment 204 and the backend server 206 may enable the user 202 to participate in virtual environments and augmented environments including metaverse applications. Metaverse applications allow a user to participate in extremely immersive experiences. The user may wear goggles for visual engagement and a partial or full-body suit with sensors to sense physical motion of the user. The user may experience a wholly virtual world or an augmented world that combines aspects of the digital world and the physical world. The user may interact with people physically present in the same space but in a virtual or augmented world. Or the user may interact with people located remotely but present virtually. In another example, the user may interact with other people as avatars in the virtual or augmented world.

In general, online games should be played with near-real-time interaction. Near-real-time generally means without any perceptible delay between an action by one of the players or the backend server 206 and a change in the game, such as the game display, as perceived by another user. Suitable communications delays may be on the order of 100 ms. Response and interaction should generally be instantaneous when perceived by users such as the user 202. The desire for near-instantaneous response is not limited to gaming. Any augmented reality or virtual reality application as well as metaverse applications will prompt a desire for immediate response with a consistent experience for the user and little to no communications interruption or delay.

It may occur at times that more substantial communications delays occur. This may be due to network congestion or latency, or for any other reasons. Current networks may not be able to support the data speeds required for presentation and interaction in a game or other experience. Further, one user such as user 202 may have access to a very high speed, low latency data network, but another user may have only a more low-speed or high latency network. Interaction between the two users may be limited by the lower speed network.

If communication delays are of a long enough duration or frequent enough, they may diminish the player's enjoyment of the game or other interactive experience. For example, some experiences are intended to be immersive for the user 202 and may include the user wearing an augmented reality headset or other equipment. If substantial communication delay occurs, slowing or delaying the communication of data to or from the user equipment 204, the immersiveness of the experience may be lost for the user 202. Brief delays of, for example, a few seconds may need to be accommodated.

In the embodiment of FIG. 2A, the user device or user equipment 204 includes a system that may be called an intelligent fair autopilot (IFA) 210. The IFA 210 in embodiments includes hardware, software or a combination, that, in the event of a communications delay, continues game play or other interaction on behalf of the user 202. The IFA 210 implements fairness in that it learns and matches the skill level or proficiency of the user 202. In this manner, when the IFA 210 becomes active, it does not add any unfair advantage, such as decreased response time, that the user 202 does not inherently possess. The IFA 210 largely mimics the performance of the user 202 at times when the user 202 is briefly interrupted from interaction with the backend server 206, other users, or both. The interruption may result from a brief disruption in communications, such as slow data transfer or packet loss. Further, the interruption may result from a slowdown in operation of the user equipment 204 of the user 202, such as slow processor or memory speeds. Still further, the interruption may result from an occurrence of the user 202, such as an injury or a distraction such as an incoming voice call. The duration of time when the IFA 210 is active on behalf of the user 202 may generally be a few seconds or up to tens of seconds during a communications delay at the user device or user equipment 204. The IFA 210 may be instantiated in any suitable user device 204 including a laptop computer, a wearable device such as virtual reality goggles, augmented reality headset or a joystick.

The IFA 210 monitors how the user 202 plays the game. The IFA 210 learns about the performance and skills of the user 202. For example, the IFA 210 learns how fast the user 202 responds to game situations, such as how fast the user runs. Further, the IFA 210 learns how user response changes over time, such as if the user 202 tires during the course of a game and can no longer run as fast as earlier in the game. The IFA 210 further learns, for example, how powerful the user 202 is, such as for kicking a ball or other action, and how high or how far the user 202 can jump. The IFA 210 further learns how game factors or environmental factors affect the performance of the user 202. For example, if in the game, it is raining and the IFA 210 has learned how the user will react to rain, such as having less-sure footing, the IFA will mimic that same change in performance. The IFA 210 learns about the capabilities and limitation of the user 202 over time.

Also during the game play, the IFA 210 monitors network quality of data communications on the network 208. The IFA 210 monitors, for example, communications delay for any reason, packet loss, problems such as full memory within the user device or user equipment 204 and other conditions that might impact user experience such as by slowing down presentation on the screen of the user device or user equipment 204. The user 202 may see the display or screen freeze or other symptom of a failed connection. Once such a condition is detected, the IFA 210 will activate and will play the game on behalf of the user 202, as if the IFA 210 is the user 202.

The IFA 210 will play the game using the intelligence of the user's capabilities and limitations learned from the user and will do so fairly by not adding any capabilities to the game play on behalf of the user 202. The IFA 210 will identify a proficiency level of the user during game play and attempt to simulate or mimic the user proficiency level when the IFA 210 controls the game play during a communication interruption. For example, the IFA 210 may determine that the user 202 is playing a soccer game and 60 minutes have elapsed in the game. In this example, the IFA 210 has learned that the user 202 normally kicks the ball at 50 miles per hour and has also learned that 60 minutes into a game, the user 202 is fatigued and only kicks the ball at 30 miles per hour. If there is a communication interruption, the IFA 210 will compete as appropriate on behalf of the user 202 and according to the current state of the game. If appropriate, the IFA 210 will initiate a kick of the ball at 30 miles per hour. When the communication interruption ends, full control will be returned to the user 202.

Similarly, the IFA 210 will identify a proficiency level of the user during game play and attempt to simulate or mimic the user proficiency level when the IFA 210 controls the game play during a communication interruption. Aspects of proficiency relate to the game being played. For example, a user playing a soccer game may be highly proficient if the user can kick the ball with high accuracy at a target such as a goal. A different user may be only slightly proficient if the different user can only kick the ball with poor accuracy. Similarly, in a personal combat game, a highly proficient user may be able to use a full range of weapons and be highly effective in the game, while a poor proficiency player may only be able to control one or two weapons with poor accuracy and effectiveness.

The IFA 210 in embodiments is powered by artificial intelligence, machine learning or a combination of these. The IFA 210 is active during the user's participation in a game or other experience using user equipment such as the user equipment 204. The IFA 210 tracks the performance of the user 202 during the game. Further, over time, such as over many experiences by the user with the game, the IFA 210 tracks the progression or regression of the user 202. For example, if through practice and experience, the skills of the user 202 improve, the improvement will be noted by the IFA 210. Similarly, if the user 202 loses or forgets skills over time, or if the skills of the user 202 erode due to fatigue during the game, it will be learned by the IFA 210 for future use. Similarly, the IFA 210 tracks aspects such as the user's speed, strength, misses and weaknesses, injuries, reactions, hand reach and grasp, jumps, selection of favorite colors, or preferred routes or other preferred aspects. This information, and more, is all learned by the IFA 210 for future use.

Further, during participation by the user 202 in a game or other experience, the IFA 210 monitors network performance and availability. The IFA 210 may use various trigger levels for activation. For example, one trigger level corresponds to a packet delay of more than 50 ms in receipt of additional data to be rendered into an experience. Another trigger level corresponds to a packet loss metric of more than 10 packets per second, or any other threshold value. The packet loss threshold value may controlled by the user 202 or by control inputs received from the backend server. Adjusting the packet loss threshold may allow the IFA 210 to be made more or less sensitive to packet loss as a trigger for activation of the IFA 210. The IFA 210 may define an acceptable QoS level or QoS threshold and, when the network provides a QoS level below the QoS threshold, an interruption is considered to occur and is considered a trigger for activating the IFA 210. Any suitable QoS threshold may be defined and may be dynamically varied or updated based on the user 202, the user equipment and the game or other interactive application. For example, some games and interactive applications are more sensitive to QoS considerations than others and the QoS threshold may be adjusted accordingly.

Another trigger corresponds to a quality of service (Qos) or other network parameter of the network 208. The QoS is a description or measurement of an overall performance of data communication in a network including the network 208. It is particularly related to the performance seen by users of the network 208, including the user 202 and the IFA 210. QoS may quantify effects of network features such as real-time lag, packet loss, bit errors, latency, packet delay variation and out of order delivery of packets.

Other triggers may be set and may be related to the user equipment, the particular network 208, or other features. For example, the IFA 210 may monitor activities and status of the user equipment 204 for the occurrence of defined trigger. In embodiments, the operating system of the user equipment 204 includes a utility called a task manager. The task manager provides information about applications that are active on the user equipment 204, including for example a percentage of processing time and a percentage of memory used by each application. The IFA 210 in embodiments obtains operational information for the user equipment 204 from the task manager utility of the user equipment. For example, the task manager utility of the user equipment may report that percentage of processing time for a processing system of the user equipment is only five percent of all available processing time. The processing time percentage may be compared with performance threshold such as a processing time threshold. Any processing time threshold, such as 10 percent, 25 percent of 50 percent of total available processing time, may be set as a trigger to activate the IFA 210. Triggers may be set automatically or manually to specify one or more applications, one or more processor percentage thresholds and one or more memory percentage thresholds. If a threshold is exceeded or a value is out of range, the condition is considered a trigger and the IFA 210 becomes active.

Moreover, the machine learning portion of the IFA 210 may learn about patterns of such triggers and may respond appropriately. For example, over time, the IFA 210 may learn that at a particular time of day, the network 208 becomes congested with other traffic and interruptions regularly occur at those times. Similarly, the IFA 210 may learn that when the user equipment 204 includes a mobile device such as a cellular phone or tablet computer, an interruption regularly occurs at a particular location due to poor network coverage. The IFA 210 learns and recognizes patterns that form such triggers and will anticipate the triggers. When a trigger occurs the IFA 210 is activated or activates itself briefly to overcome this short-duration poor performance.

In some embodiments, the IFA 210 or the backend server 205 or both can be configured to share information about the status of the IFA 210. Such status may include information about whether and when the IFA 210 is active.

In applications when the user equipment 204 generates a hologram for the user, such as the metaverse, when the IFA 210 becomes active, the holographic representation of the user 202 may be briefly duplicated by the IFA 210 to carry over the playing of the game by the user 202, acting as the avatar. The IFA 210 imitates closely the movements and behavior and other characteristics of the avatar until the communication is restored. For example, in the metaverse, if the holograms were talking at the time of the communication interruption, the IFA 210 will continue the conversation. In another example, the IFA 210 monitors active conversation during the game to identify future actions discussed or planned by the user and other participants. If the user 202 tells another user, for example, "I will go with you to visit the new virtual store on our break from the game," in the event of a communication interruption, the IFA 210 generates an alternate hologram that executes the action promised. In yet another example, the IFA 210 can maintain possession of real and virtual objects for the user 202. If the user 202 earns cryptocurrency in the game, for example, the IFA 210 can hold the cryptocurrency for some time until the interruption ends and communication resumes.

Figure 2B:
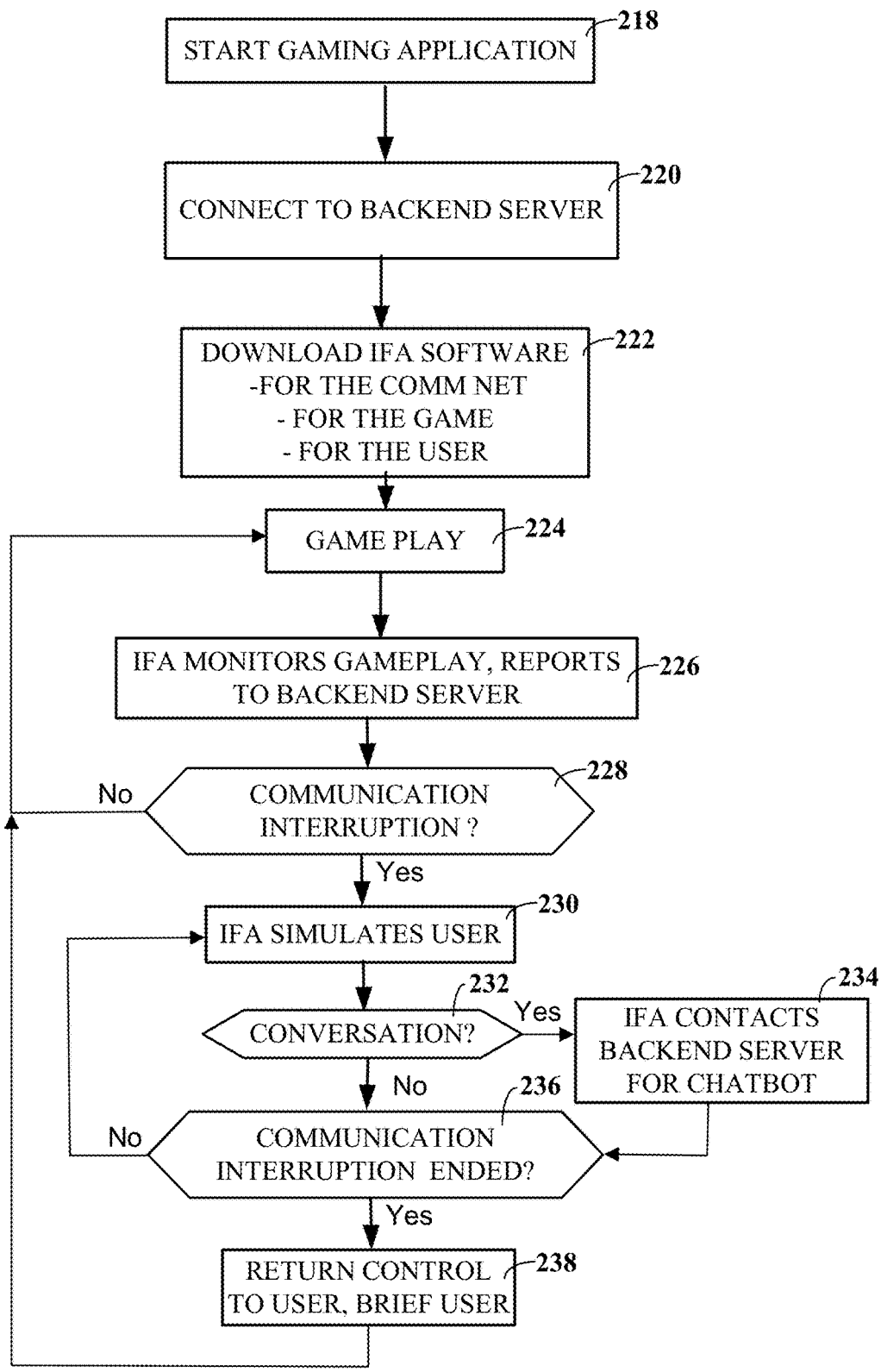
FIG. 2B depicts an illustrative embodiment of a method in accordance with various aspects described herein.

FIG. 2B depicts an illustrative embodiment of a method 216 in accordance with various aspects described herein.

The method 216 illustrates exemplary operation of the IFA 210 of FIG. 2B. The method may operate, for example, on the user equipment 204, including any device the user 202 may employ to participate in an interactive activity such as gaming. The user equipment is used to access and implement a service which will operate to make brief delays from one or more player's networks unnoticeable and transparent to players for a more pleasant experience, in which an autopilot continues the game in a fair manner. The service may be offered as a product by an online service provider. In embodiments, the user employs a web browser to access a web site or other network resource. The user may register for the service, provide payment, establish a user profile specifying user interests and user equipment, and other functions.

The service may be implemented by network accessible processing systems such as backend server 206 (FIG. 2A). The server or other processing system maintains a library of software associated with various different games or other interactive applications that a user may choose to engage with. The software in the library includes data and instructions that allows the cooperation of a server component with a client component at the user equipment of the user, using data communication over a network. Most electronic games and other interactive applications have application programming interfaces (API) that allows other software to access and control functions of the game. The library stores APIs for games or other interactive applications. One or more APIs may be provided from the backend server and library to the IFA on the client device or user equipment.

At step 218 in this example, a gaming application is initiated on the user equipment. For example, the user may turn on the user equipment, connect peripheral devices such as googles, headsets, a supplemental display and a body suit with sensors, and then select a game to play on the user equipment. The user may specify features of the game to enable or disable. Further, the user may contact a remote gaming service over a network to initiate play of an interactive game, including interacting with one or more other players or interacting with the gaming server or gaming service itself. In other examples, rather than a gaming application, the user initiates another type of interactive application. Initiating the gaming application or another application may also initiate operation of the intelligent fair autopilot (IFA) application on the user equipment. The IFA application may be started automatically, responsive to initiation of the gaming application, or the user may manually initiate the IFA application.

At step 220, the user equipment connects to the backend server associated with the IFA functionality. The backend server may be any suitable processing equipment for providing the functionality of the IFA to multiple users. The backend server and its functionality may be offered as a service by a service provider, with access by subscription or on another limited basis. The communication from the user equipment may include any suitable information, such as identification of the user and user credentials. The communication from the user equipment may further specify what game is selected by the user and any gaming options. The communication from the user equipment may also specify information about one or more communication networks used for operation of the gaming application or otherwise available to the user equipment. For example, the user equipment may normally communicate over a cable modem with an internet service provider but have available a network connection through the user's mobile phone on a mobility network.

At step 222, the user devices receive the IFA software from the backend server or other source. In embodiments, the IFA software is tailored by the backend server for the game the user has selected, for the communication networks available to the user equipment and to the user equipment itself. Further, the IFA software is tailored to the user's preferences and abilities. For example, if the user has employed the IFA software to play the game before, the IFA functionality has information such as a user profile for the user, based on the past experience and observing the user. This user information or user profile may be regularly updated with developed knowledge about the user, such as how the user plays the game, the user's physical abilities and limitations when playing the game, and any other useful information. For example, if the game is soccer or an interactive soccer simulator, the IFA and backend server may have collected information in the past about the user's leg strength and stamina and ability to run. That information may be useful to the IFA if the IFA has to play the game on behalf of the user. If the game is other than soccer, such as a warcraft game, other types of information may be collected and added to a user profile at the backend server and downloaded to the user equipment at step 222.

At step 224, game play begins. The user interacts with the user equipment to play the game. The user equipment is in data communication with a remote gaming server, a remote gamer, or both, to interactively play the game. Data of the game is exchanged over a network to provide visual, audible and other aspects of the game for the user.

At step 226, as the game is played, the IFA application on the user equipment monitors the game play and continues to learn about the user. The IFA may, from time to time, report information about the user or the game to the backend server. The backend server 226 has current information about the game, the user, and the players or devices the user interacts with.

At step 228, the IFA application monitors the data communication between the user equipment and the network. Further, the IFA application monitors the status of the user equipment itself. The IFA monitors to detect any disruption to interactive game play. The IFA monitors to determine if there is an interruption in communication with the network or an interruption in operation or game play by the user equipment. The interruption may be only momentary, such as due to a brief delay in packet communication or packet latency over the network or a temporarily full memory buffer at the user equipment. The IFA may monitor, for example, any aspect of quality of service (QoS) of the communication over the network. If no interruption is detected, control returns to step 224. The IFA and user equipment may remain in a loop including game play, monitoring user behavior and monitoring communication with the network.

If, at step 228, a communication interruption or other disruption to interactive game play is detected by the IFA, at step 230 the IFA begins simulating game play by the user. In embodiments, the IFA steps in and takes over largely instantaneously so that other players or the gaming servers are not aware of the communication interruption. This ensures that any immersive experience or gaming experience is not diminished due to communication limitations or other equipment failures.

At step 232, the IFA determines if a conversation or chat has been occurring by the user at the time of the communication interruption. If a conversation is underway, at step 234 the IFA contacts the backend server for assistance. The IFA may require software to provide functionality such as a chatbot to continue the conversation in place of the user. A chatbot may include a computer program intended to replicate human conversation. The IFA will continue the conversation, simulating the statements and responses of the user based on the knowledge of the user learned by the IFA. The IFA will continue conversing, taking the point of view or position of the user. In that way, the conversation continues uninterrupted from the point of view of the other party.

At step 236, the IFA determines if the communication interruption or other disruption to interactive game play has ended. For example, the IFA monitors the QoS of communications between the network and the user equipment. If the interruption continues, control returns to step 230, and the IFA continues simulating the user in game play. If reliable communication has resumed, at bock 238, the IFA returns control of the game to the user and, if necessary, briefs the user on any conversation that has been had or changes to the game status. The briefing may be provided in any suitable manner, such as an audible update, text or other messaging that is displayed on a display screen of the user equipment or as a floating text seen by the user in the user's goggles or headset.

While for purposes of simplicity of explanation, the respective processes are shown and described as a series of blocks in FIG. 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2C:
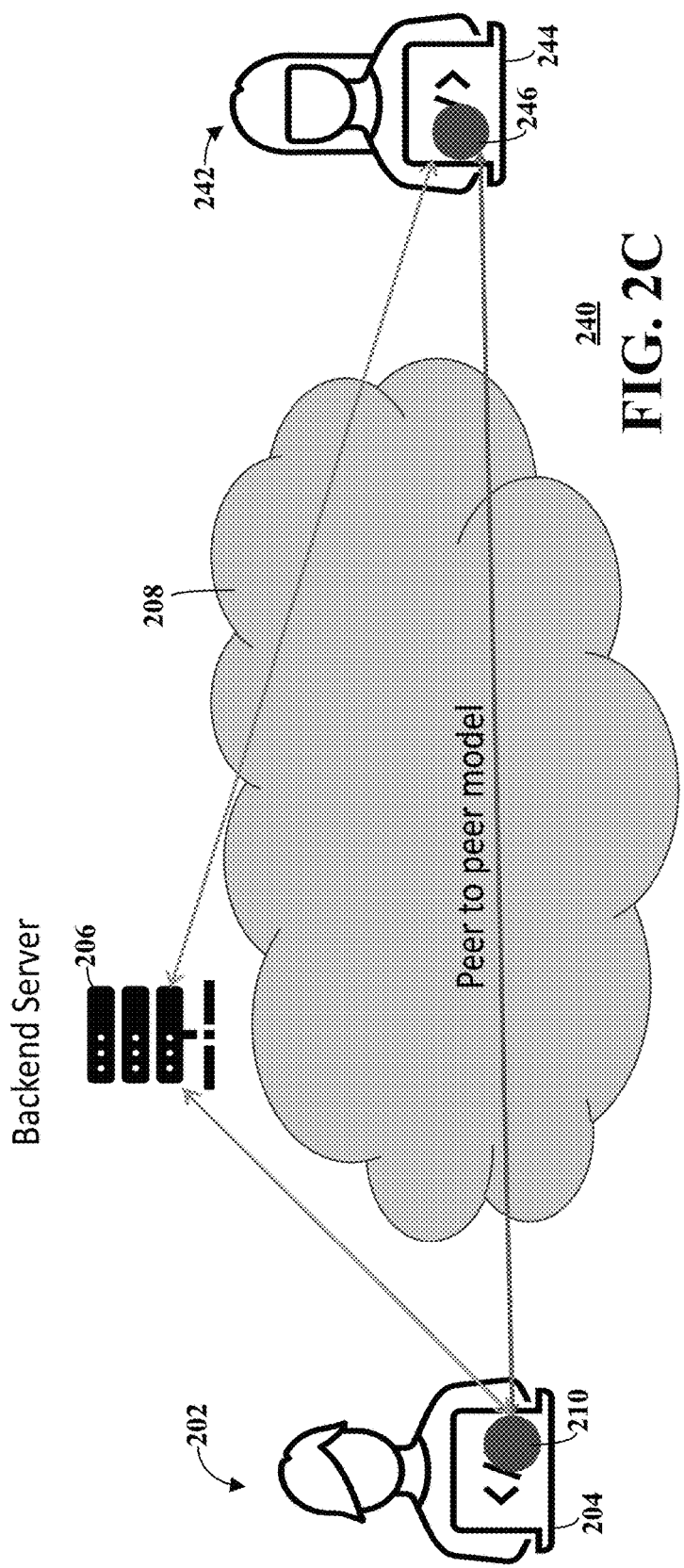
FIG. 2C depicts an illustrative embodiment of a communication network in accordance with various aspects described herein.

FIG. 2C depicts an illustrative embodiment of a communication network 240 in accordance with various aspects described herein. In particular, FIG. 2C depicts a situation in which a player's network communication experiences low QoS or other communication interruption. A first player or first user 202 employs user equipment 204 equipped with IFA 210. Similarly, a second player or second user 242 employs second user equipment 244 equipped with IFA 246. The first player or first user 202 and the second player or second user 242 exchange data over network 208 and engage in an interactive application such as a game. The second user equipment 244 may include any of the features or aspects described above in connection with user equipment 204 in FIG. 2A. The IFA 246 similarly is characterized by features of IFA 210. However, the IFA 246 is customized or otherwise adapted to the second user 242 and second user equipment 244.

In FIG. 2C, the IFA 210 and the IFA 246 are each an embedded software applications, each with a separate networking interface to periodically measure the network performance and communicate with the corresponding IFA at the other user equipment. The two IFAs, IFA 210 and IFA 246, measure end to end quality of service (QoS) for the communication channel between the two devices, including over network 208.

Figure 2D:
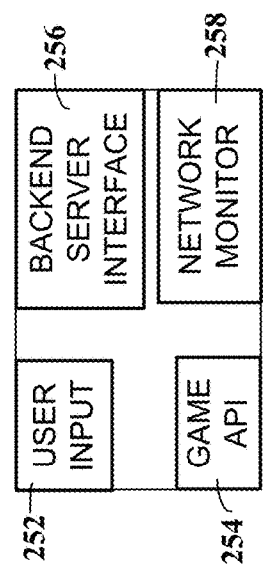
FIG. 2D depicts an illustrative embodiment of a functional block diagram of an intelligent fair autopilot (IFA) in accordance with various aspects described herein.

FIG. 2D depicts an illustrative embodiment of a functional block diagram of an intelligent fair autopilot (IFA) 250 in accordance with various aspects described herein. The IFA 250, including some or all of its constituent elements, may be embodied as hardware and software and data, or any combination of these. The software and data may be stored on user equipment such as user equipment 204 and second user equipment 244 of FIG. 2C. In the event of a disruption to interactive game play by the user equipment, the IFA 250 will detect the disruption and step in to continue the game play, operating to control game play as the user to make brief delays from a network unnoticeable and transparent to other players. In this exemplary embodiment, the IFA includes a user input module 252, a game application programming interface (API) 254, a backend server interface 256 and a network monitor module 258.

The user input module 252 operates to collect user inputs and actuations when playing in a game or other interactive application. The user input module 252 may collect the widest variety of input information, from user speech as detected by a microphone of the user equipment to user motion as detected by motion sensors, a joystick or other actuators. The user input module 252 associates each user input with a game activity. For example, in a soccer game, the user may kick a virtual soccer ball. The user input module 252 detects the kick from data of the motion sensors, including features such as the speed or force of the kick, the elapsed time into the soccer game at which the kick occurs, the relative accuracy of the kick, etc. This information is suitably stored at the IFA 250. In some embodiments, this information may be reported outside the IFA 250 such as to a backend server or to another player's IFA or game application.

The game API 254 provides communication with a game operating on the user equipment. The IFA 250 may control functions of the game through suitable data and commands provided to the API of the game application on the user equipment. For example, if the IFA 250 is in control of game play due to temporary disruption of interactive game play, and the IFA 250 determines that the proper action in the game is to kick a soccer ball, the game API 254 may be used to provide suitable commands to the API of the game application to cause the player in the game to initiate a suitable kick. The game API 254 is generally tailored to each particular game so that appropriate data and instructions can be provided to the game application. In the event the user changes from one game to a second game, a new game API 254 will be obtained, either from memory of the IFA 250 or by network download from a suitable source such as a backend server.

The game API 254 in embodiments operates to mimic the performance of the user of the user equipment during times when communication from the user equipment is interrupted and the IFA 250 must simulate game inputs of the user based on the user inputs collected during times when communication was reliably intact and the user was actively playing the game. In general, the game API 254 operates to fairly mimic the performance of the user by performing at the same level or similar proficiency as the user. User proficiency may be defined relative to particular requirements of a particular game. For example, proficiency at a soccer game may relate to leg strength of the player, player stamina and physical coordination of the player. Moreover, user proficiency may vary over time, as a user becomes distracted or physically tired during a soccer game. Proficiency in a game involving hand to hand combat may involve physical strength and endurance, but also quick reflexes and precise hand-eye coordination. In other embodiments, processes of simulating user behavior and mimicking user performance may be assigned to other constituent components of the IFA 250. User performance may be mimicked to any suitable degree. For example, in a soccer game where many players are competing together, the user's precise actions and responses may not need to be duplicated because precise details may not be evident of detectable to competitors in a hotly contested game. On the other hand, some activities of a user, such as continuing a conversation of chat between the user and another player, should be duplicated with high precision to avoid a mismatch between the response of the IFA 210 and the mimicked response of the user 202.

The backend server interface 256 provides data communication interface with a remote source such as a backend server. The backend server interface 256 receives data and instructions from the backend server and provides data and other information to the backend server. In embodiments, the IFA 250 and the backend server use one or more unique data communication protocols. The backend server interface 256 provides necessary protocol translation such and encryption and packetization for communication over a network with the backend server.

The network monitor module 258 monitors communication on the network to the backend server and to other user equipment. In the event of a disruption to interactive game play by the user equipment, the network monitor module 258 detects the disruption and signals other components of the IFA 250 to respond accordingly. Further, the network monitor module 258 monitors activity and response of the user equipment on which the IFA is resident and, in the event of an operational delay that would affect interactive game play or other interaction by the user of the user equipment, the network monitor module 258 signals other components of the IFA 250 to respond. During a disruption to interactive game play, the network monitor module 258 continuously monitors network communications to detect a return to normal communication and the end of the disruption. When the end of the disruption is detected, the network monitor module 258 signals the other components of the IFA accordingly. In embodiments, the network monitor measures QoS for communications with another IFA with which the user equipment interacts or with the backend server.

Referring again to FIG. 2C, during game play or other application interaction, the network monitor module 258 monitors the status of communication end to end between the first player or first user 202 and the second player or second user 242. Any communication parameter or key performance indicator may be monitored by the network monitor module 258. An example is communication quality of service or QoS. Once QoS falls below a specified threshold value, the local IFA, such as IFA 210 or IFA 246 is activated.

In some embodiments, the IFA conserves bandwidth on the interrupted connection by switching communication protocols. This may be particularly useful where communication continues but with excessive delay due to packet loss, in the event packet loss exceeds a threshold value. In an example, the IFA 210 at the first user equipment 204 switches to a protocol employing relatively short and small packets for communicating with the other IFA 246 at the second user equipment 244. In a further example, the IFA 210 at the first user equipment 204 uses a special, abbreviated language learned by the IFA 210 and the IFA 246 over the course of the game. This may be similar to, for example, short, compressed language some artificial intelligence modules have been shown to use when communicating together. The IFA 210 and the IFA 246 use abbreviated terms to exchange information about background colors, game information, player motions, motions of balls or other game pieces, etc. The IFA that receives these abbreviated terms translates them to terminology to control the game through the game API 254 (FIG. 2D).

In another example, the compressed or abbreviated language may include encoded information such as a four byte or even four-bit code that may be exchanged to specify a set of four steps or operations to take at the particular time in the game. The coded values and corresponding actions are defined for the respective IFAs and may be downloaded from the backend server 206 at the time a game is initiated or at the time an IFA is initiated. Normally, the IFA devices need more information, more bits, to control and present the game. However, for a short duration when communication is interrupted, the encoding of actions in a reduced amount of data enables sufficient control of the game, with the goal that the players are not aware of effects on game play due to the interruption in communication. If communication between the IFA 210 and the IFA 246, the backend server 206 steps in to keep the game running.

Figure 2E:
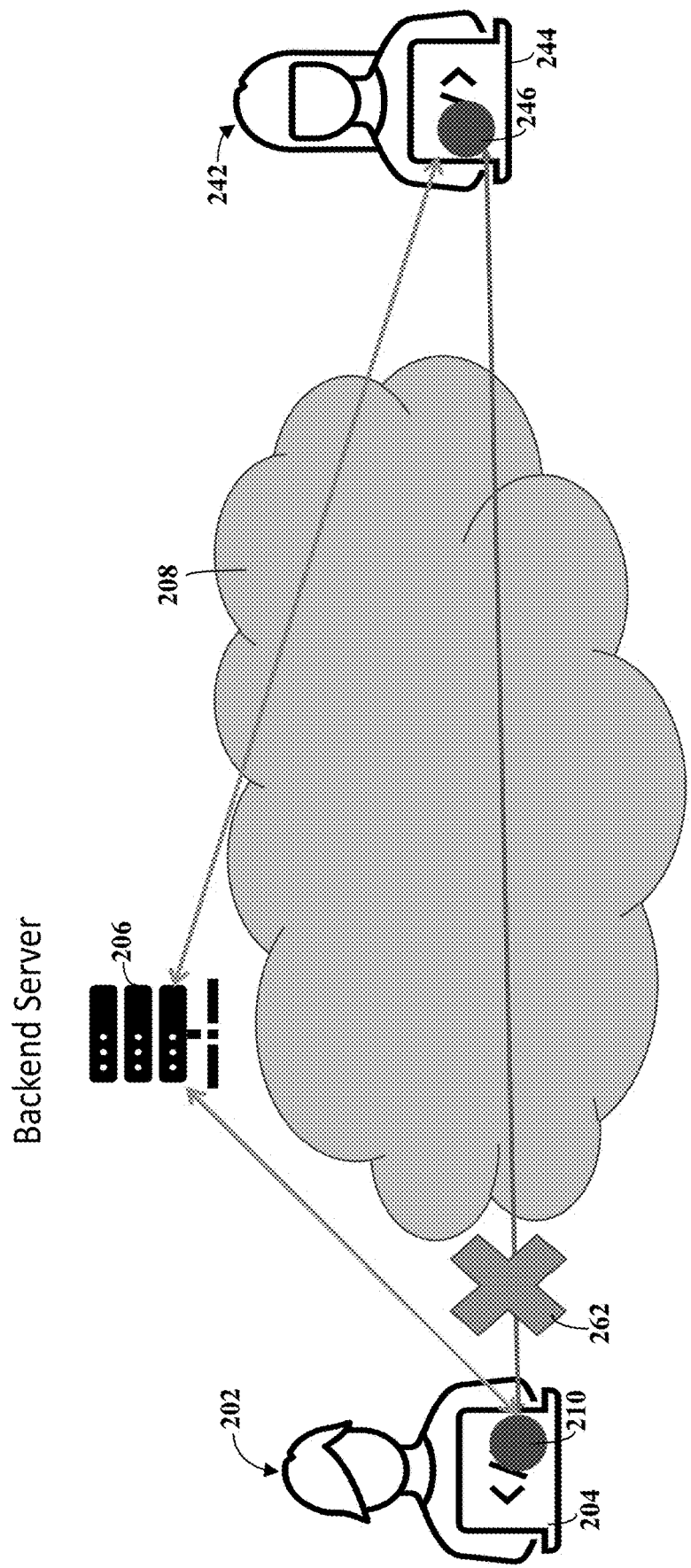
FIG. 2E depicts an illustrative embodiment of a communication network in accordance with various aspects described herein.

FIG. 2E depicts an illustrative embodiment of a communication network 260 in accordance with various aspects described herein. In the example of FIG. 2E, a brief but severe interruption of communications between the network 208 and the first user equipment 204. The interruption may last for, for example, a few seconds. The interruption is indicated by broken connection 262 on the communication channel with the second user equipment 244.

The IFA 210 of the first user equipment detects the broken connection 262 to the network 208 and reports the broken connection 262 to the backend server 206. The IFA 210 may report, for example, that it is detecting big delays or an increase in lost packets and may be about to be cut off from network communication. The backend server 206 receives the information about the broken connection 262 from the IFA 210 and automatically assumes the role of the first user 202 in the game or other interactive activity with the second user 242. The assumption of the role by the backend server 206 is generally instantaneous and not detectable by the second user 242. The backend server 206 monitors the game state and steps in, in the place of the first user 202, in the event of an interruption.

When the interruption ends, the IFA 210 reports the resumption of normal communication to the backend server 206. The backend server 206 yields control of the game to the first user 202 in a way that the second user 242 is not aware or disturbed by the change. Further, the backend server 206 notifies the IFA 210 about events or transactions that occurred during the interruption. For example, if there was conversation or chatting during the interruption, the content is reported by the backend server 206 to the IFA 210. The IFA 210 in turn reports to the first user 202 so the first user 202 may resume game play and conversation as normal.

In some embodiments, the first user 202 may select an option to allow the IFA 210 or the backend server 206 to continue playing the game for a predetermined time period in the event of an interruption which is not a communications interruption. For example, if the first user 202 is anticipating a phone call, the first user 202 may select this option and, when the call is received, the IFA 210 of the backend server 206 assume the role of the first user during the duration of the call or other interruption. In this example, the IFA 210 may be communicatively coupled to the phone or other communication device of the first user 202 to automatically detect the call and begin operation on behalf of the first user. In another example, the first user 202 may become injured during game play or otherwise briefly incapacitated and unable to actively participate in the game. In that case, the IFA 210 may continue playing for the user 202 so as not to interrupt the game and to maintain the apparent presence of the first user 202 for the second user 242. In embodiments, this feature may be selected or activated by the first user 202 and further, in situations where the IFA 210 steps in in place of the first user 202 due to an injury or other occurrence, the second user 242 may be informed of the activation of the IFA 210 in any suitable manner, such as an audible alert or a visual alert.

Figure 2F:
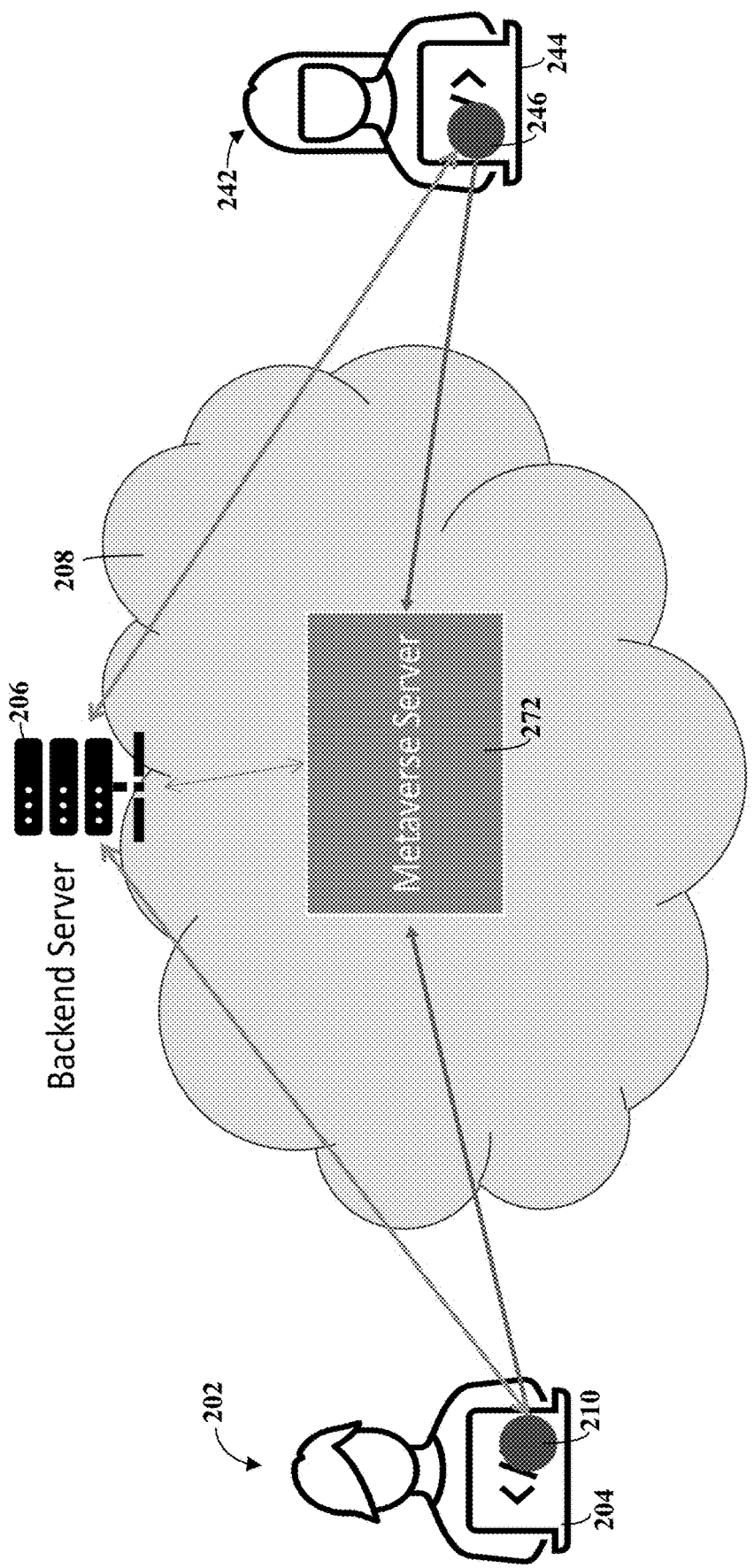
FIG. 2F depicts an illustrative embodiment of a communication network in accordance with various aspects described herein.

FIG. 2F depicts an illustrative embodiment of a communication network 260 in accordance with various aspects described herein. In the example of FIG. 2F, two users such as first user 202 and second user 242 meet virtually in a central system such as the metaverse, illustrated as metaverse server 272. The first user 202 and the second user 242 together participate in an interactive activity such as gaming. The metaverse server 272 is accessible over the network 208 by the first user equipment 204 and the second user equipment 244. Other users, not illustrated in FIG. 2F, may access the metaverse server and participate in interactive applications such as gaming.

The first user equipment 204 includes IFA 210. Similarly, the second user equipment 244 includes IFA 246. The backend server 206 communicates with the IFA 210, the IFA 246 and the metaverse server 272. Such communications may be according to any suitable format or protocol and occur over networks including the network 208.

The metaverse server 272 operates to create a virtual world or an augmented world in which the first user 202 and the second user 242 participate and interact with virtual objects. In embodiments, the metaverse server 272 implements aspects of what is conventionally called the Metaverse. In other embodiments, the metaverse server 272 implements aspects of any virtual environment experienced by the first user 202 and the second user 242. For example, the metaverse server 272 may implement some or all aspects of a virtual reality (VR) experience in which the first user 202 and the second user 242 interact with each other and with other virtual objects. The virtual objects and virtual environment are created and controlled by the metaverse server 272. The first user 202 and the second user 242 may wear virtual reality goggles and other user equipment to implement the virtual environment locally. In another example, the metaverse server 272 may implement an augmented reality (AR) environment or AR experience in which the first user 202 and the second user 242 interact with each other and some combination of real-world items and virtual items. The real-world environment is augmented with virtual aspects created and controlled by the metaverse server 272. Again, the first user 202 and the second user 242 may wear particular equipment such as body suits with sensors, AR helmets, etc., to participate in the AR environment.

The IFA 210, the IFA 246 and the backend server 206 cooperate to maintain a consistent experience for the participants, even in the face of a communication interruption or an equipment failure, or inability of a player to participate briefly. If a connection is interrupted for either the first user 202 or the second user 242, the IFA 210 or the IFA 246 will report the interruption to the backend server 206 and the backend server 206 will step in and appear to the other user as the user whose connection is interrupted. Similarly, if a player such as first user 202 is injured or otherwise briefly indisposed and unable to participate, the IFA 210 will report the interruption to the backend server 206 and the backend server 206 will step in and appear to the other user as the user whose connection is interrupted. The duration may be controlled or specified by one or both users but is generally just a few seconds or tens of seconds long until communication is restored and normal operation resumes, or until the indisposed player is able to resume.

In embodiments using a central entity such as the metaverse server 272, the IFA 210 and IFA 246 monitor communication with the metaverse server 272. Any suitable communication parameter or key performance indicator may be monitored as an indicator of communication quality. In examples, QoS is monitored by the IFA devices. If QoS goes below a specified threshold value, the local IFA, either IFA 210 or IFA 246, is activated. For example, if the IFA 246 of the second user 242 determines that QoS has fallen below a specified threshold lever (which may be set by the second user 242 or the backend server 206, for example), the IFA 246 become active. In embodiments, the IFA 246 may communicate with the IFA 210 of the first user using short, small packets or using an abbreviated language developed jointly by the IFA 246 and IFA 210. The metaverse server 272 receives the shortened or abbreviated messages and translates them to commands and data usable by the game application. In this manner, the game play may continue even when communication between the players is poor. If communication is totally cut off to one or both players, the backend server 206 may take over and step in on behalf of one of the players.

In embodiments, the user or player has control over options that allow configuration of the IFA and the backend server and the extent to which those devices respond to a communication interruption. In some exemplary embodiments, the user can select a mode of operation. In a transparent mode, each payer will know that the IFA is activated. That is, the IFA and the backend server may notify all players, including the first player and the second player, that an automatic control of game play may occur if there is detected network game play interruption. For example, the activation may be reported by the local IFA on the user's own device or user equipment. For example, at the time the IFA becomes active, there may be no communication to the other user equipment. The notification that the IFA service is in transparent mode may be given persistently, throughout the game, so that all players are aware of the status. In other embodiments, the notification that the IFA service is in transparent mode may be given only when the IFA is actually active, playing the game in place of a player. Other options that may be configurable include the length of time during which the IFA service is active during a communication interruption. For example, the user may specify that the IFA service be active for interruptions up to 10 seconds long; any disruption longer than 10 seconds will be disclosed and game play will stop. The number 10 seconds is intended to be exemplary only. Any duration may be specified.

In a gaming environment, as a further configuration options, the players could opt not to calculate scores for the game during this period when transparent mode is active. In a stealthy mode, other players will not know when a player's IFA is active. The other players do not notice any variation from normal performance and the game play continue as usual. A notification that the IFA service is active or inactive can be given in any suitable manner. For example, the notification could include a different hologram color viewable to one or more competitors, a floating color or color region in the field of view, such as in the background of a player's view, or an audible notification such as an audible beep.

In embodiments, the IFA features can be activated or inactivated individually at each user device or by making a suitable entry in a user profile for the user stored at the backend server 206. In other embodiments, the IFA features can be activated or inactivated globally or based on membership in a group or class of users. For example, some players compete against one another in some interactive games. At some levels of competition, the games may be organized and sanctioned and under the control or rules of some authority. For users involved in such a competition, the features of IFA may be turned off or inactivated so as not to affect the sanctioned competition. Alternative, the IFA feature can be set to a stealthy option and available to all or a subset of competitors.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of system 100, the subsystems and functions of system 200, and method 230 presented in FIGS. 1, 2A, 2B, 2C, 2D, 2E 2F, and 3. For example, virtualized communication network 300 can facilitate in whole or in part learning about how a user plays a game in an interactive gaming application with another player, detecting an interruption in network communication such as excessive delay that could create an apparent absence of the user from the game for the other player, and automatically controlling game play during the interruption to simulate game inputs of the user based on how the user plays the game to make apparent absence of the user from the game transparent to the other player.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
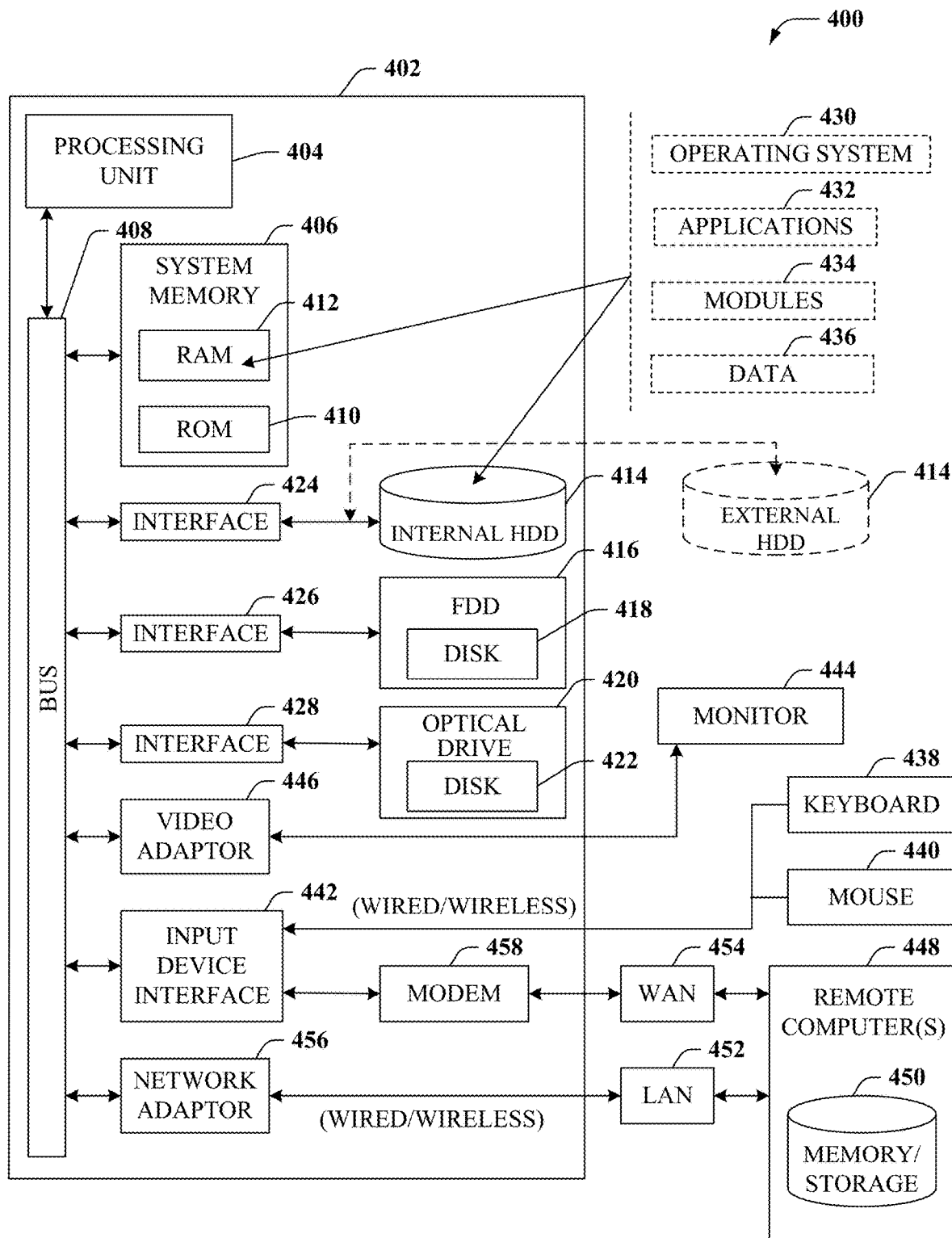
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part learning about how a user plays a game in an interactive gaming application with another player, detecting an interruption in network communication such as excessive delay that could create an apparent absence of the user from the game for the other player, and automatically controlling game play during the interruption to simulate game inputs of the user based on how the user plays the game to make apparent absence of the user from the game transparent to the other player.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
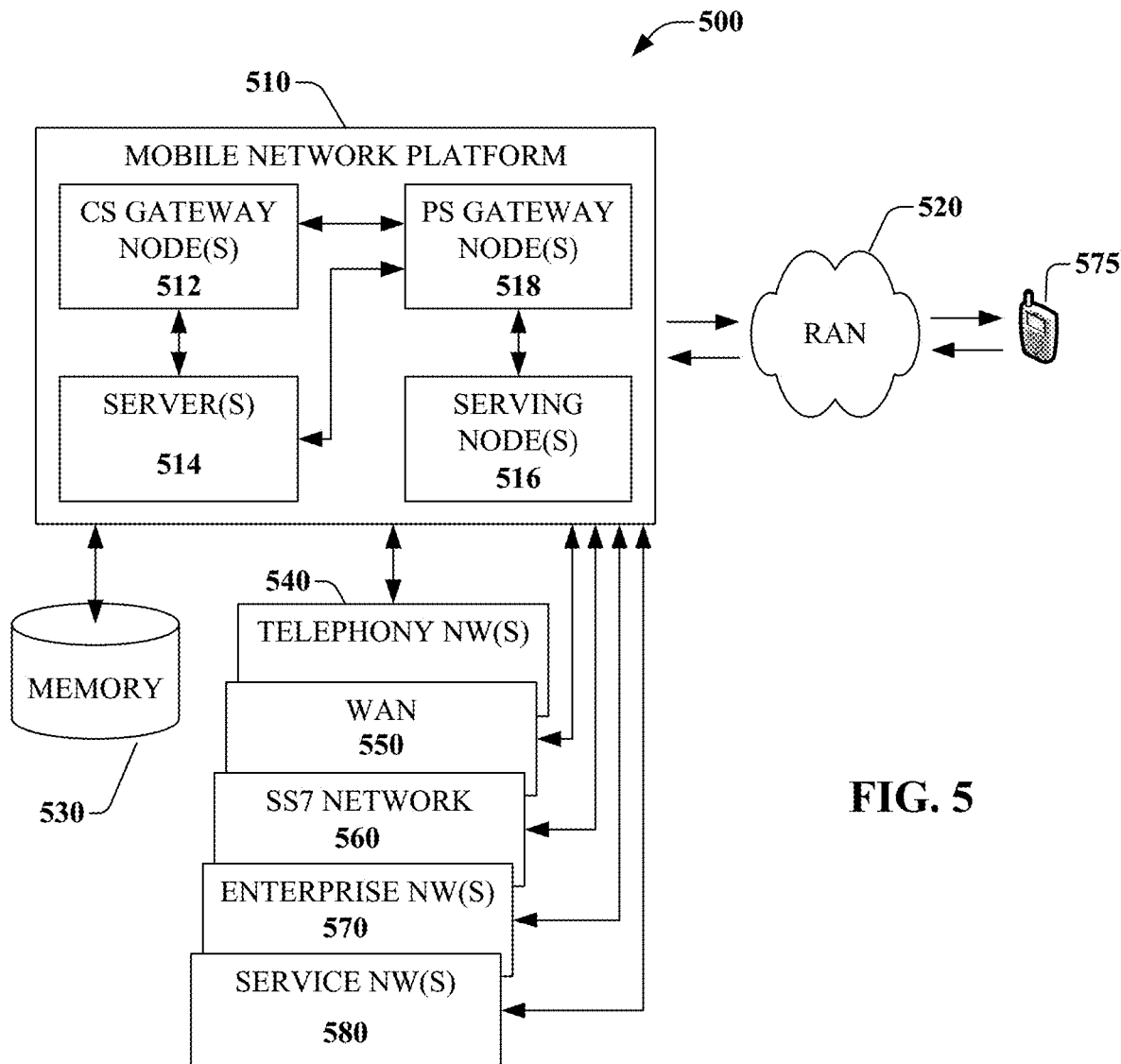
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part learning about how a user plays a game in an interactive gaming application with another player, detecting an interruption in network communication such as excessive delay that could create an apparent absence of the user from the game for the other player, and automatically controlling game play during the interruption to simulate game inputs of the user based on how the user plays the game to make apparent absence of the user from the game transparent to the other player. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, which facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technologies utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
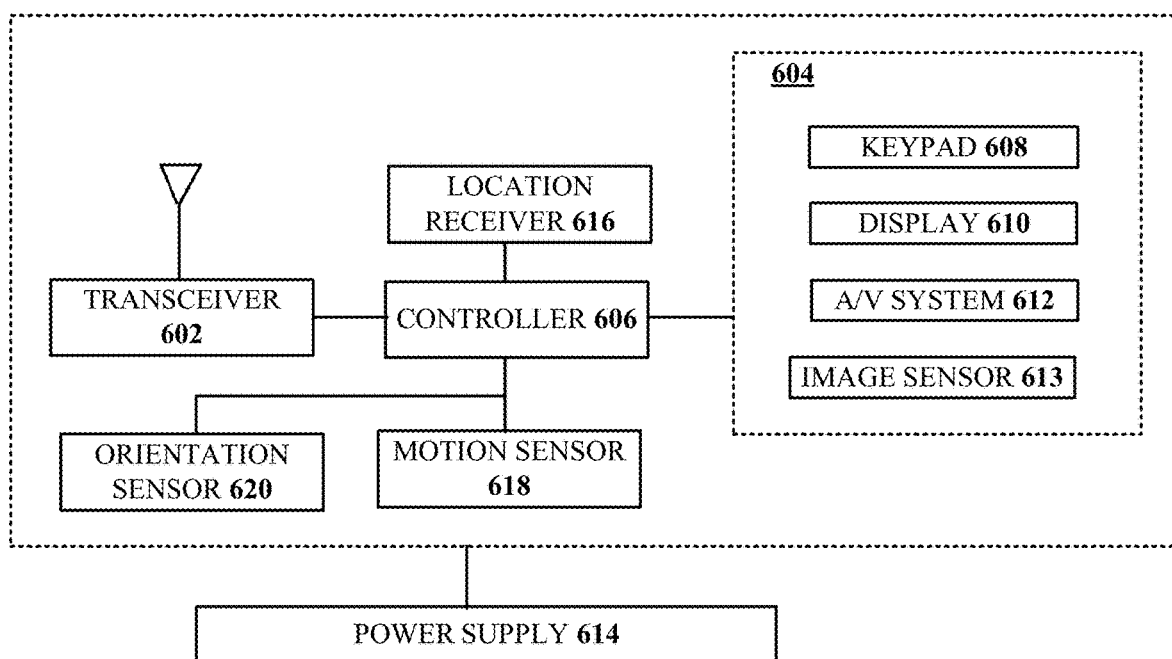
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part learning about how a user plays a game in an interactive gaming application with another player, detecting an interruption in network communication such as excessive delay that could create an apparent absence of the user from the game for the other player, and automatically controlling game play during the interruption to simulate game inputs of the user based on how the user plays the game to make apparent absence of the user from the game transparent to the other player.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1λ, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi_____33, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via a observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
receiving collected user inputs during game play by a user at user equipment, in an interactive game with a remote user provided by a gaming application, the user equipment in data communication over a network with remote user equipment of the remote user;
tracking a performance of the user during game play including a progression or a regression over time and a plurality of aspects of the performance of the user during game play including a user's speed, strength, misses and weaknesses, injuries, reactions, head reach and grasp, jumps, selection of colors, preferred routes, or a combination thereof;
learning, using machine learning, the performance of the user and the plurality of aspects of the performance of the user during game;
monitoring a network connection over the network between the user equipment and the remote user equipment based on a trigger level for activation, wherein the trigger level is indicative of a network connection interruption that leads to a network game play interruption during the game play;
upon a detection of the trigger level for activation, executing an intelligent fair autopilot (IFA) system that mimics the learned performance of the user and the learned plurality of aspects of the performance of the user; and
deactivating the IFA system once the network connection interruption is restored.

2. The device of claim 1, wherein the operations further comprise identifying the network game play interruption responsive to a packet loss condition exceeding a threshold value.

3. The device of claim 1, wherein the operations further comprise identifying the network game play interruption responsive to comparing a quality of service (QOS) level for the data communication over the network between the user equipment and the remote user equipment.

4. The device of claim 1, wherein the operations further comprise identifying the network game play interruption responsive to receiving a communication from a task manager utility of the user equipment, the communication from the task manager utility indicating a percentage of processing time for a processing of the user equipment and comparing the percentage of processing time with a performance threshold.

5. The device of claim 1, wherein the operations further comprise identifying the network game play interruption responsive to a packet delay exceeding 50 ms.

6. The device of claim 1, wherein the operations further comprise determining a level of performance of the user during game play and imitating the level of performance of the user during the network game play interruption.

7. The device of claim 6, wherein the operations further comprise identifying a variation in the level of performance of the user over time during game play and imitating the variation in the level of performance of the user during the network game play interruption.

8. The device of claim 1, wherein the executing the IFA system further comprises automatically control game play during the network game play interruption to simulate game inputs of the user based on the collected user inputs so the remote user is unaware of the network game play interruption and the simulating the game inputs of the user during the network game play interruption to avoid unfair advantage during the automatically controlling the game play.

9. The device of claim 8, wherein the device comprises a user equipment device for use by the user during the game play.

10. The device of claim 1, wherein the device comprises a server in data communication with a user equipment device use by the user during game play.

11. A non-transitory, machine-readable medium, comprising executable instructions that, when executed by a processing system including a processor, facilitate performance of operations, the operations comprising:
detecting user gaming inputs during game play by a user at user equipment, in an interactive gaming application with a remote user, the user equipment in data communication over a network with remote user equipment of the remote user;
learning, using machine learning, from the user gaming inputs, information about capabilities of the user in the interactive gaming application, forming learned user game play information including a user's speed, strength, misses and weaknesses, injuries, reactions, head reach and grasp, jumps, selection of colors, preferred routes, or a combination thereof;
monitoring data communication over a network connection over the network between the user equipment and the remote user equipment based on a trigger level for activation, wherein the trigger level is indicative of a network connection interruption that leads to a network game play interruption during the game play,
the network game play interruption causing an apparent absence of the user during a network game play interruption duration; and
upon a detection of the trigger level for activation, executing an intelligent fair autopilot (IFA) system that mimics the learned user game play information; and
generating an output that executes an action of the user or a representation of the user that corresponds to the apparent absence of the user while the IFA system is active.

12. The non-transitory, machine-readable medium of claim 11, wherein the operations further comprise:
comparing a network communication performance parameter with a performance threshold; and
identifying the network game play interruption responsive to the comparing.

13. The non-transitory, machine-readable medium of claim 12, wherein the comparing the network communication performance parameter with the performance threshold comprises:
determining a current network Quality of Service (QOS) value; and
comparing the current network QoS value with a QoS threshold.

14. The non-transitory, machine-readable medium of claim 11, wherein the executing the IFA system further comprises automatically control game play during the network game play interruption to simulate game inputs of the user based on the learned user game play information, the automatically controlling game play including mimicking the user gaming inputs to make the apparent absence of the user during the network game play interruption duration transparent to the remote user; and the operations further comprise:
learning a proficiency of the user in the interactive gaming application; and
automatically controlling game play to mimic the proficiency of the user during the automatically controlling the game play.

15. The non-transitory, machine-readable medium of claim 14, wherein the operations further comprise:
automatically continuing a conversation between the user and the remote user during the network game play interruption duration, during the apparent absence of the user;
returning control of the conversation to the user following the network game play interruption duration; and
briefing the user about contents of the conversation automatically continued during the apparent absence of the user.

16. The non-transitory, machine-readable medium of claim 11, wherein the operations further comprise:
receiving an input specifying a transparent mode of operation; and
operating in the transparent mode of operation, including notifying all users, including the user and the remote user, that an automatic control of game play during a detected network game play interruption may occur.

17. A method, comprising:
learning, using machine learning, by a processing system including a processor, information about capabilities and performance of a user during game play in an interactive gaming application including a user's speed, strength, misses and weaknesses, injuries, reactions, head reach and grasp, jumps, selection of colors, preferred routes, or a combination thereof, forming learned user game play information, the user interacting with user equipment in the interactive gaming application with remote user equipment of a remote user over a network;
monitoring, by the processing system, data communication over a network connection between the processing system and the network with the remote user equipment;
identifying, by the processing system, a network game play interruption during the game play, the network game play interruption causing an apparent absence of the user to the remote user during a network game play interruption duration;
upon the identification of the network game play interruption, executing an intelligent fair autopilot (IFA) system that mimics the learned user game play information to make the apparent absence of the user transparent to the remote user;
generating an output that executes an action or a representation of the user that corresponds to the apparent absence of the user while the IFA system is active; and
deactivating the IFA system once the network game play interruption is restored.

18. The method of claim 17, comprising:
detecting, by the processing system, a broken network connection between the user equipment and the remote user equipment;
transferring, by the processing system, automatic control of the game play during the network game play interruption to a backend server system in data communication with the user equipment; and
receiving, by the processing system, from the backend server system, return of the automatic control of the game play following a resolution of the broken network connection.

19. The method of claim 18, comprising:
reporting, by the processing system, to the backend server system, information about a state of a game during the game play in the interactive gaming application, the reporting including reporting the learned user game play information.

20. The method of claim 18, comprising:
identifying, by the processing system, the resolution of the broken network connection;
reporting, by the processing system, to the backend server system, information about the resolution of the broken network connection; and
receiving, by the processing system, information from the backend server system about events and transactions that occurred in the game play during a duration of the broken network connection.

\* \* \* \* \*